US009749678B2

(12) United States Patent
Kellerman et al.

(10) Patent No.: US 9,749,678 B2
(45) Date of Patent: *Aug. 29, 2017

(54) VIDEO CHANNEL CHANGE SYSTEM (71) Applicant: BROADCOM CORPORATION, Irvine, CA (US)

(72) Inventors: Marcus Christopher Kellerman, Poway, CA (US); Jeffrey P. Fisher, Dublin, CA (US); Alex Pelts, Morgan Hill, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,544

(22) Filed: Feb. 17, 2015

(65) Prior Publication Data

US 2015/0163538 A1 Jun. 11, 2015

Related U.S. Application Data (63) Continuation-in-part of application No. 13/963,950, filed on Aug. 9, 2013, now Pat. No. 9,036,092, and a continuation-in-part of application No. 12/493,464, filed on Jun. 29, 2009, now abandoned.

(60) Provisional application No. 61/838,812, filed on Jun. 24, 2013.

(51) Int. Cl.
*H04N 21/434* (2011.01)
*H04N 21/438* (2011.01)
(Continued)

(52) U.S. Cl.
CPC .......... *H04N 21/4343* (2013.01); *H04N 5/50* (2013.01); *H04N 21/4302* (2013.01);
(Continued)

(58) Field of Classification Search
CPC .................................................. H04N 21/4343
(Continued)

(56) References Cited

U.S. PATENT DOCUMENTS 5,864,682 A * 1/1999 Porter .................. G11B 27/031
348/E7.073
6,175,595 B1 1/2001 Keesman
(Continued)

OTHER PUBLICATIONS

"Chapter 7. MPEG-2 System Layer", retreived from <www.uic.edu/classes/ece/ece434/chapter_file/cpater7.htm> on May 23, 2013, pp. 1-7.
(Continued)

*Primary Examiner* — Paulos M Natnael
*Assistant Examiner* — Justin Sanders
(74) *Attorney, Agent, or Firm* — McDermott Will & Emery LLP (57) ABSTRACT

A video channel change system may include one or more processors and a memory. The one or more processors may receive first packets including first video frames associated with a first video channel and second packets including second video frames associated with a second video channel. The one or more processors may decode the first packets and display the first video frames while buffering, in a buffer, the second packets. The one or more processors may determine that a packet of the second packets includes a random access point without decoding the packet, discard the second packets from the buffer that were received prior to the packet, buffer additional second packets received subsequent to the packet, and decode the second packets stored in the buffer and display the second video frames included therein, in response to a request to change from the first video channel to the second video channel.

20 Claims, 7 Drawing Sheets

(51) Int. Cl.
 H04N 21/4405 (2011.01)
 H04N 21/439 (2011.01)
 H04N 21/4402 (2011.01)
 H04N 21/845 (2011.01)
 H04N 5/50 (2006.01)
 H04N 21/43 (2011.01)
 H04N 21/44 (2011.01)

(52) U.S. Cl.
 CPC ..... *H04N 21/4347* (2013.01); *H04N 21/4384* (2013.01); *H04N 21/4392* (2013.01); *H04N 21/4398* (2013.01); *H04N 21/44004* (2013.01); *H04N 21/4405* (2013.01); *H04N 21/440281* (2013.01); *H04N 21/8455* (2013.01)

(58) Field of Classification Search
 USPC .......................................................... 348/731
 See application file for complete search history.

(56) References Cited

U.S. PATENT DOCUMENTS

| | | | |
|---|---|---|---|
| 6,650,640 B1* | 11/2003 | Muller | H04L 49/90 370/392 |
| 6,807,191 B2 | 10/2004 | Fujii et al. | |
| 6,911,986 B1 | 6/2005 | Aneja et al. | |
| 6,985,188 B1 | 1/2006 | Hurst, Jr. | |
| 2005/0018775 A1 | 1/2005 | Subramanian et al. | |
| 2005/0172314 A1 | 8/2005 | Krakora et al. | |
| 2007/0223538 A1 | 9/2007 | Rodgers | |
| 2007/0234395 A1* | 10/2007 | Dureau | H04N 5/4401 725/135 |
| 2008/0301745 A1* | 12/2008 | Liu | H04N 21/2221 725/110 |
| 2009/0245393 A1 | 10/2009 | Stein et al. | |
| 2010/0329354 A1* | 12/2010 | Kellerman | H04N 21/4384 375/240.25 |
| 2012/0151540 A1* | 6/2012 | Stanwood | H04L 65/00 725/109 |

OTHER PUBLICATIONS

International Telecommunication Union, "Transmission of Non-Telephone Signals—Information Technology—Generic Coding of Moving Pictures and Associated Audio Information: Systems", ITU-T Recommendation H.222.0, 134 pages, Jul. 1995.
International Standard, "Information technology—Generic coding of moving pictures and associated audio information: Systems", Reference No. ISO/IEC 13818-1:2000(E), Section 2.4 and Annex D, ISO/IEC 2000, 174 pages, Switzerland.
ISO/IEC 13818-2: 1995 (E), Section 6, ISO/IEC, Switzerland, 255 pages.

\* cited by examiner

VIDEO CHANNEL CHANGE SYSTEM

CROSS-REFERENCE TO RELATED APPLICATIONS

This application is a continuation-in-part of U.S. application Ser. No. 13/963,950, entitled "Video Channel Change System," filed on Aug. 9, 2013, now issued as U.S. Pat. No. 9,036,092, which claims the benefit of U.S. Provisional Patent Application Ser. No. 61/838,812, entitled "Video Channel Change System," filed on Jun. 24, 2013. This application is also a continuation-in-part of U.S. application Ser. No. 12/493,464, entitled "Systems and Methods For Achieving Optimal Digital Channel Change Performance," filed on Jun. 29, 2009. All of the aforementioned patent applications are hereby incorporated by reference in their entirety for all purposes.

TECHNICAL FIELD

The present description relates generally to channel change, and more particularly, but not exclusively, to a video channel change system.

BACKGROUND

A digital content distribution network may distribute multiplexed streams that include a number of digital video and/or audio channels. In order to display a video stream associated with a video channel, a receiving device may need to perform a series of steps that include, e.g., tuning to an appropriate radio frequency (RF) channel, acquiring and demodulating a digital signal, demultiplexing a multiplexed stream to obtain a video stream, identifying a random access point in the video stream, and displaying the video stream. Accordingly, there may be latency associated with displaying a video stream associated with a video channel. The latency may be particularly noticeable when a viewer is changing between video channels, since the viewer may be accustomed to a video channel being displayed immediately upon changing channels.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
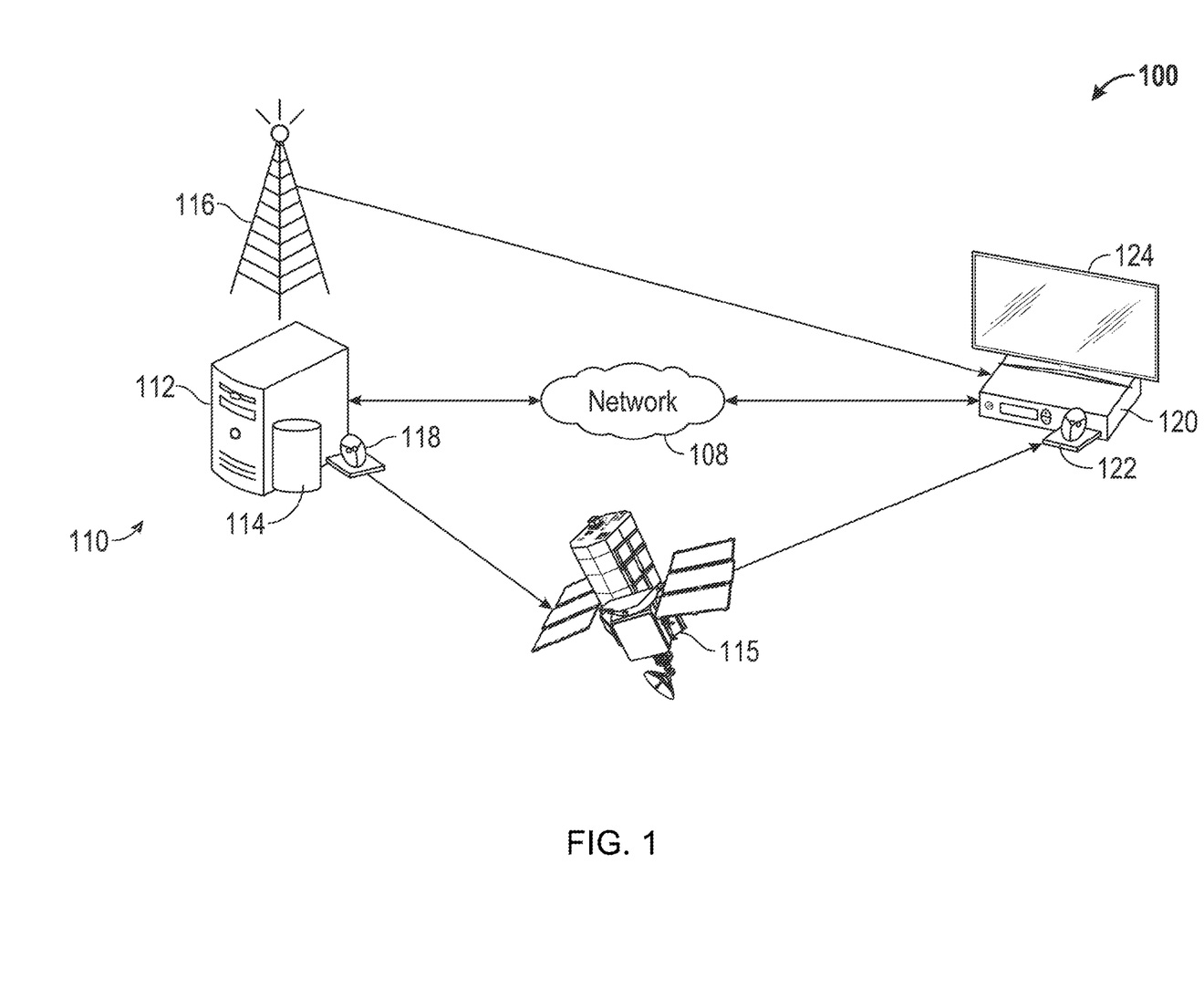
FIG. 1 illustrates an example network environment in which a video channel change system may be implemented in accordance with one or more implementations.

FIG. 1 illustrates an example network environment 100 in which a video channel change system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112, an antenna 116 for transmitting data streams, such as multiplexed streams, over the air, and a satellite transmitting device 118 that transmits data streams, such as multiplexed streams to a satellite 115. The electronic device 120 may include, and/or may be coupled to, a satellite receiving device 122, such as a satellite dish, that receives data streams, such as multiplexed streams, from the satellite 115. In one or more implementations, the electronic device 120 may further include an antenna for receiving data streams, such as multiplexed streams over the air from the antenna 116 of the CDN 110. The content server 112 and/or the electronic device 120, may be, or may include, one or more components of the electronic system discussed below with respect to FIG. 7.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices and/or a data store 114. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, that may be collocated with the content server 112 or may be disparately located from the content server 112.

The electronic device 120 may include, or may be coupled to, one or more processing devices and/or a memory. In one or more implementations, the electronic device 120 may be, or may include, a set-top box, e.g. a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as multiplexed streams, that include content items, such as television programs, movies, or generally any content items. The electronic device 120 may receive the streams from the CDN 110 via the antenna 116, via the network 108, and/or via the satellite 115. An example electronic device 120 is discussed further below with respect to FIG. 2.

The CDN 110 may transmit video and/or audio streams that include content items, such as television programs, movies, or generally any multimedia programs, via the network 108, the antenna 116, and/or the satellite 115. For example, the CDN 110 may transmit Internet Protocol (IP) streams, such as unicast, multicast, or broadcast streams, that include content items over the network 108 and the CDN 110 may transmit QAM-modulated and/or multiplexed streams that include content items via the coaxial transmission line, the antenna 116 and/or the satellite 115, e.g. through the satellite transmitting device 118. In one or more implementations, the CDN 110 may be representative of multiple disparate content delivery networks that are configured to transmit content streams to the electronic device 120.

In one or more implementations, any of the streams transmitted by the CDN 110 may be a transport stream that includes one or more types of transport stream packets, such as an MPEG transport stream. For example, the content server 112 of the CDN 110 may packetize the video frames of video streams into packetized elementary stream (PES) packets. Thus, each PES packet may include one video frame and the PES packets may be variable sized to account for the varying sizes of different types of video frames, e.g. I-frames, B-frames, P-frames, etc. The content server 112 may then segment and encapsulate the PES packets into transport stream packets, such as MPEG transport stream packets, which may be a fixed size, such as 188-byte packets. The header of a transport stream packet may include one or more data fields pertaining to the payload of the transport stream packet, such as a payload unit start indicator (PUSI) bit. The content server 112 may set the PUSI bit to 1 if the transport stream packet includes the start of a PES packet, which also coincides with the start of a video frame. Thus, the PUSI bit indicates whether the transport stream packet includes the start of a video frame. In one or more implementations, the content server 112 may encrypt the payloads of the transport stream packets, but not the headers of the transport stream packets. An example transport stream that includes transport stream packets and PES packets is discussed further below with respect to FIG. 6.

The content server 112 may multiplex multiple video and/or audio streams of different programs into a multiplexed stream and may transmit the multiplexed stream to the electronic device 120. For example, the content server 112 may provide content, such as programs, that are associated with multiple channels, such as multiple video channels. The content server 112 may generate transport streams for the programs being presented on each video channel, e.g. the video and/or audio streams of the programs. The content server 112 may multiplex the transport streams to generate a multiplexed stream and the content server 112 may transmit the multiplexed stream to the electronic device 120. An example multiplexed stream is discussed further below with respect to FIG. 5.

In one or more implementations, video channels may be logical groupings of sequential sets of programs, or video and/or audio streams, that are provided by the CDN 110 to the electronic device 120, and that may be presented, by the electronic device 120 to a user, such as on the display 124. For example, the user may view a first program on a first video channel and may change to a second video channel to view a second program. The CDN 110 may provide a guide to the electronic device 120 that indicates the sequential order that the programs will be presented on each video channel, and the electronic device 120 may provide the guide to the user, e.g. via the display 124.

The electronic device 120 may receive the multiplexed stream, e.g. by tuning to an appropriate radio frequency (RF) channel and acquiring and demodulating a digital signal. The electronic device 120 may demultiplex the multiplexed stream to obtain transport stream packets that contain a first video stream e.g. a video stream corresponding to a video channel being presented on the display 124. The electronic device 120 may decode and/or decrypt the transport stream packets to retrieve the PES packets that include the portions of the video frames. The electronic device 120 may decode the PES packets and combine the portions of the video frames to recover the first video stream. The electronic device 120 may identify a random access point in the first video stream and may display the first video stream on the display 124. In one or more implementations, decoding the packets that contain a video and/or audio stream may refer to decoding and/or decrypting the transport stream packets, decoding and/or decrypting the PES packets, and combining the portions of the video frames from each PES packet to decode the video stream.

In order to provide one or more aspects of the subject video channel change system, the electronic device 120 may acquire and buffer the transport stream packets for other video streams from the multiplexed stream while displaying the video frames of the first video stream on the display 124. For example, the other video streams may be associated with programs of video channels for which the corresponding audio and/or video streams are not being displayed on the display 124. In one or more implementations, the electronic device 120 may be capable of decoding and/or decrypting the transport stream packets of other video channels, and retrieving the associated video frames, while a first video stream is being displayed, in which case the video frames of the video streams, e.g. the elementary stream data, may be buffered rather than the transport stream packets. However, in one or more implementations, the electronic device 120 may not be able to decode and/or decrypt the transport stream packets corresponding to other video streams while a first video stream is being displayed, and therefore the transport stream packets that contain the video frames for the other video streams are buffered by the electronic device 120.

The transport stream packets and/or video streams that are buffered may be associated with video channels that have a high likelihood of being requested by the user, e.g. video channels having channel numbers that are adjacent to the video channel being viewed, video channels frequently viewed, the last video channel viewed, etc. Thus, if the user requests to change to a video channel for which the corresponding transport stream packets and/or video frames are buffered, the electronic device 120 can display the video stream associated with the requested video channel with little delay. However, the electronic device 120 may only be able to display the video stream starting at a random access point in the video stream, such as an I-frame. Thus, in order to display the video stream, the buffered video stream and/or buffered transport stream packets should include at least one random access point.

If the electronic device 120 can access video frames of a buffered video stream, the electronic device 120 may be able to identify random access points in the video stream, such as I-frames, and may manage the buffered video stream such that there is at least one buffered random access point at any given time. However, if the electronic device 120 cannot access the video frames, e.g. the electronic device 120 has buffered encrypted transport stream packets and/or encrypted PES packets, the electronic device 120 may implement a probabilistic random access point determination to estimate the location of a random access point, e.g. the start of an I-frame, within the transport stream packets by utilizing properties of the transport stream packets and/or the video frames. For example, since I-frames are generally significantly larger than other video frames, such as P-frames or B-frames, the electronic device 120 may be able to determine that an I-frame was received when a large number of transport stream packets were received between two transport stream packets that include a PUSI bit set to one. The electronic device 120 may then determine that the first of the two transport stream packets that has the PUSI bit set to one includes a PES packet that contains the starting portion of an I-frame. Furthermore, the electronic device 120 may utilize known, or determinable, group of pictures (GOP) patterns, e.g. I-B-P-P . . . -I, associated with the video stream of a given video channel, to increase the accuracy of estimating the locations of the random access points with the video stream. An example process for estimating the location of a random access point is discussed further below with respect to FIG. 3.

In one or more implementations, in order to ensure at least one random access point, e.g. at least one I-frame, is buffered when the underlying video frames are inaccessible, the electronic device 120 may store the buffered transport stream packets for a given channel in a buffer that is sized such that at least one I-frame is always stored in the buffer. For example, the buffer may be a first-in-first-out (FIFO) buffer and/or a compressed data buffer (CDB), and the electronic device 120 may set the buffer size to the size of the GOP structure, e.g. the GOP size, that is used for the video stream. Thus, as the transport stream packets, or portions thereof, e.g. elementary stream (ES) data if the transport stream packets are unencrypted, are pushed into the buffer and the buffer fills, older transport stream packets, or portions thereof, are discarded from the buffer. In one or more implementations, the electronic device 120 may set the buffer size to the size of the GOP structure without monitoring the PUSI bit or other information from the transport stream packets.

In one or more implementations, the electronic device 120 may determine an appropriate buffer size for a given video channel on a trial and error basis. For example, the electronic device 120 may set the size of the buffer for a given video channel an average GOP size of video streams that have been processed by the electronic device 120. During operation, the electronic device 120 may determine that the buffer is too small if the transport stream packets stored in the buffer do not include an I-frame when the buffered transport stream packets are decoded, e.g. when a video channel change occurs. Similarly, the electronic device 120 may determine that the buffer is too large if the transport stream packets stored in the buffer include multiple I-frames when the buffered transport stream packets are decoded, e.g. when a video channel change occurs. The electronic device 120 may store the buffer size determined for each video channel and/or for each program of each video channel, e.g. in a data table, and the electronic device 120 may retrieve the buffer size for a video channel and/or program the next time that transport stream packets corresponding to the video channel and/or program are buffered for a video channel change.

After the electronic device 120 performs a video channel change, e.g. using a buffered random access point of a video stream corresponding to the video channel, the video stream being displayed on the display 124 may be temporally behind the live transport stream, e.g. since the electronic device 120 needs to display the buffered video frames before the live video frames can be displayed. In order to account for the delay, the electronic device 120 may set the System Clock Reference (SCR)/Program Clock Reference (PCR) associated with the video stream such that the video stream is displayed with a fixed delay from the live transport stream for the duration of period that the video stream is displayed on the display 124.

In one or more implementations, the electronic device 120 may perform a fast forward that is unperceivable to the viewer on the displayed video stream and/or output audio stream in order to catch up to the video and/or audio frames of the live transport stream. For example, the electronic device 120 may periodically drop video frames, starting from the nearest random access point, to catch up to the live transport stream, and the electronic device 120 may speed up the outputted audio stream, starting from the nearest random access point, to catch up to the live transport stream. In one or more implementations, if the electronic device 120 is unable to fast forward the buffered audio stream, e.g. if the audio stream is output in a compressed format, the electronic device 120 may output the audio stream of the live transport stream after a video channel change, and the electronic device 120 may fast forward the buffered video stream to catch up with the live audio stream. Thus, the audio and video streams may be slightly out of sync until the buffered video stream catches up with the live audio stream. In one or more implementations, the electronic device 120 may implement both of the aforementioned techniques, e.g. when a set-top box is capable of outputting the decoded audio stream or the compressed audio stream. An example process for coordinating the displaying of buffered content with live content is discussed further below with respect to FIG. 4.

Figure 2:
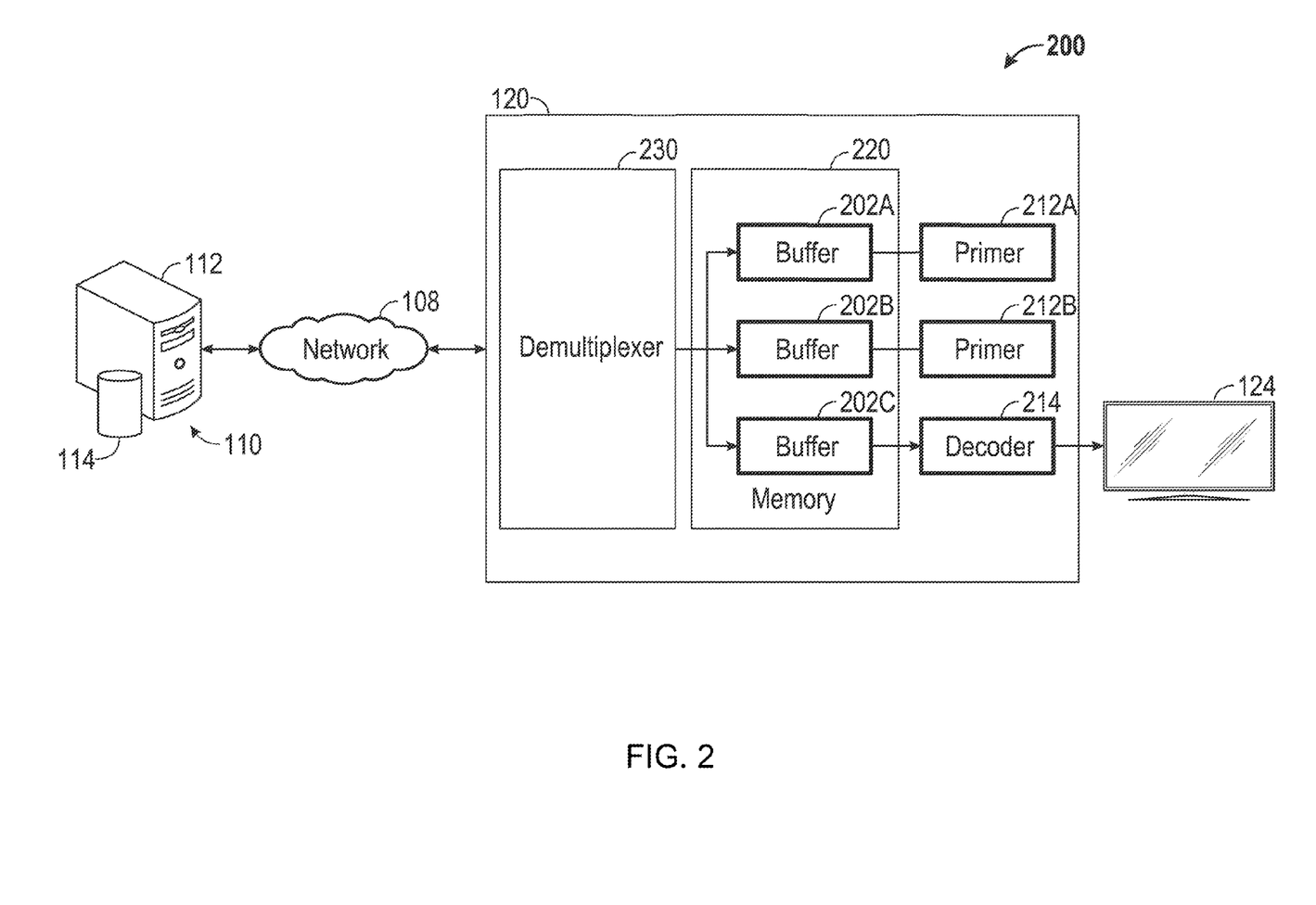
FIG. 2 illustrates an example network environment in which a video channel change system may be implemented in accordance with one or more implementations.

FIG. 2 illustrates an example network environment 200 in which a video channel change system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 200 includes a CDN 110, a network 108, an electronic device 120, and a display 124. The CDN 110 includes a content server 112 and a data store 114. The electronic device 120 includes a demultiplexer 230, memory 220, primers 212A-B and a decoder 214. The memory 220 includes buffers 202A-C. In one or more implementations, the buffers 202A-C may be FIFO memories and/or compressed data buffers (CDBs).

In operation, the content server 112 transmits a multiplexed stream of programs, e.g. video and/or audio streams, over the network 108 to the electronic device 120. Upon receiving the multiplexed stream, the electronic device 120 may acquire one or more overhead information items from the multiplexed stream and may store the information items in the memory 220. The overhead information items may include information that is applicable to multiple streams of the multiplexed stream, such as one or more encryption keys for decrypting the streams, program specific information (PSI), system information (SI), or generally any information that may pertain to multiple streams.

After acquiring any overhead information items, the demultiplexer 230 demultiplexes the multiplexed stream into individual transport streams, such as transport streams that contain video and/or audio streams corresponding to one or more video channels. The transport stream packets of each demultiplexed transport stream are stored in separate buffers 202A-C of the memory 220. For example, the transport stream packets for a first program, e.g. of a first video channel, may be stored in the buffer 202A, the transport stream packets corresponding to a second program, e.g. of a second video channel, may be stored in the buffer 202B, and the transport stream packets corresponding to a third program, e.g. of a third video channel, may be stored in the buffer 202C. In one or more implementations, any of the buffers 202A-C may store PES data carried by the transport stream packets. For example, the buffer 202C may store PES data corresponding to the third program.

The decoder 214 may retrieve the PES data from the buffer 202C, decode the PES data, and display the video stream and/or output the audio stream corresponding to the third program on the display 124. In one or more implementations, the decoder 214 may utilize one or more overhead information items to decode the PES data. Since the buffer 202C may be a FIFO memory, the decoder 214 may decode and display the video frames in accordance with a presentation timeline that may generally coincide with the order in which the transport stream packets were received.

While the decoder 214 is decoding and displaying the third program, the transport stream packets corresponding to the first and second programs are stored in the buffers 202A-B. The primers 212A-B manage the buffers 202A-B, respectively, such that the buffers 202A-B, respectively, only include one random access point at any given time. A random access point may be a point in a video stream, generally the start of a video frame, where the decoder 214 can start decoding properly from scratch, e.g. without accessing any other frames. In one or more implementations, a random access point may be an I-frame of the video stream. However, the primers 212A-B may, in one or more implementations, be unable to decode the transport stream packets to determine the location of an I-frame or other random access point. For example, the transport stream packets may be encrypted and the encryption key may not be accessible to the primers 212A-B and/or the encryption key may not be accessible while the decoder 214 is decrypting the transport stream packets stored in the buffer 202C.

Thus, the primers 212A-B may estimate the lengths of the frames of the transport streams buffered in the buffers 202A-B, without decoding the transport stream packets, such as by monitoring the number of transport stream packets that are received between each transport stream packet that includes a PUSI indicator set to one, e.g. indicating that the transport stream packet includes the start of a video frame. Since I-frames, or other random access points, may generally be larger than other types of frames, e.g. B-frames, P-frames, etc., the primers 212A-B may be able to identify a transport stream packet that contains the start of a random access point based on the estimated frame lengths, e.g. when a frame having a large length is identified.

Upon identifying that a transport stream packet including the start of a random access point has been received, the primers 212A-B may flush the buffers 202A-B of any transport stream packets received prior to the transport stream packet that includes the start of the random access point. In one or more embodiments, flushing the transport stream packets from the buffers 202A-B may refer to discarding the transport stream packets, deleting the transport stream packets, overwriting the transport stream packets, marking the transport stream packets for deletion and/or removal, or updating a current sequence number to the sequence number of the transport stream packet that includes the start of the random access point. The primers 212A-B may continue to monitor and flush the buffers 202A-B, such that the buffers 202A-B each continuously and exclusively include a single random access point, which is generally the most recently received random access point. An example process for monitoring and flushing the buffers 202A-B is discussed further below with respect to FIG. 3.

If, while displaying the video stream of the first program from the buffer 202C, the electronic device 120 receives a request to change the video channel, e.g. to display the video stream of the second program from the buffer 202B, the decoder 214 may retrieve the transport stream packets of the second program from the buffer 202B and immediately begin decoding and/or decrypting the transport stream packets from the buffer 202B. Since the primer 212B has managed the buffer 202B such that the first transport stream packet stored in the buffer 202B includes the start of the most recently received random access point, the decoder 214 may immediately begin displaying the video stream of the second program and displaying the video stream on the display 124 with little delay. In one or more implementations, the decoder 214 may retrieve one or more overhead information items from the memory 220, e.g. without reacquiring the information items from the multiplexed stream, and the decoder 214 may utilize the overhead information items in decoding, decrypting, and/or displaying the video stream of the second program.

In one or more implementations, the decoder 214 may need to coordinate the output of the portion of the video stream and/or audio stream of the first program that is stored in the buffer 202B with the live video stream, e.g. the video stream that is being received as the buffered portion is being decrypted, decoded, and/or displayed. An example process for coordinating the output of the buffered portion of the video stream and/or audio stream with the live video stream and/or audio stream is discussed further below with respect to FIG. 4.

Figure 3:
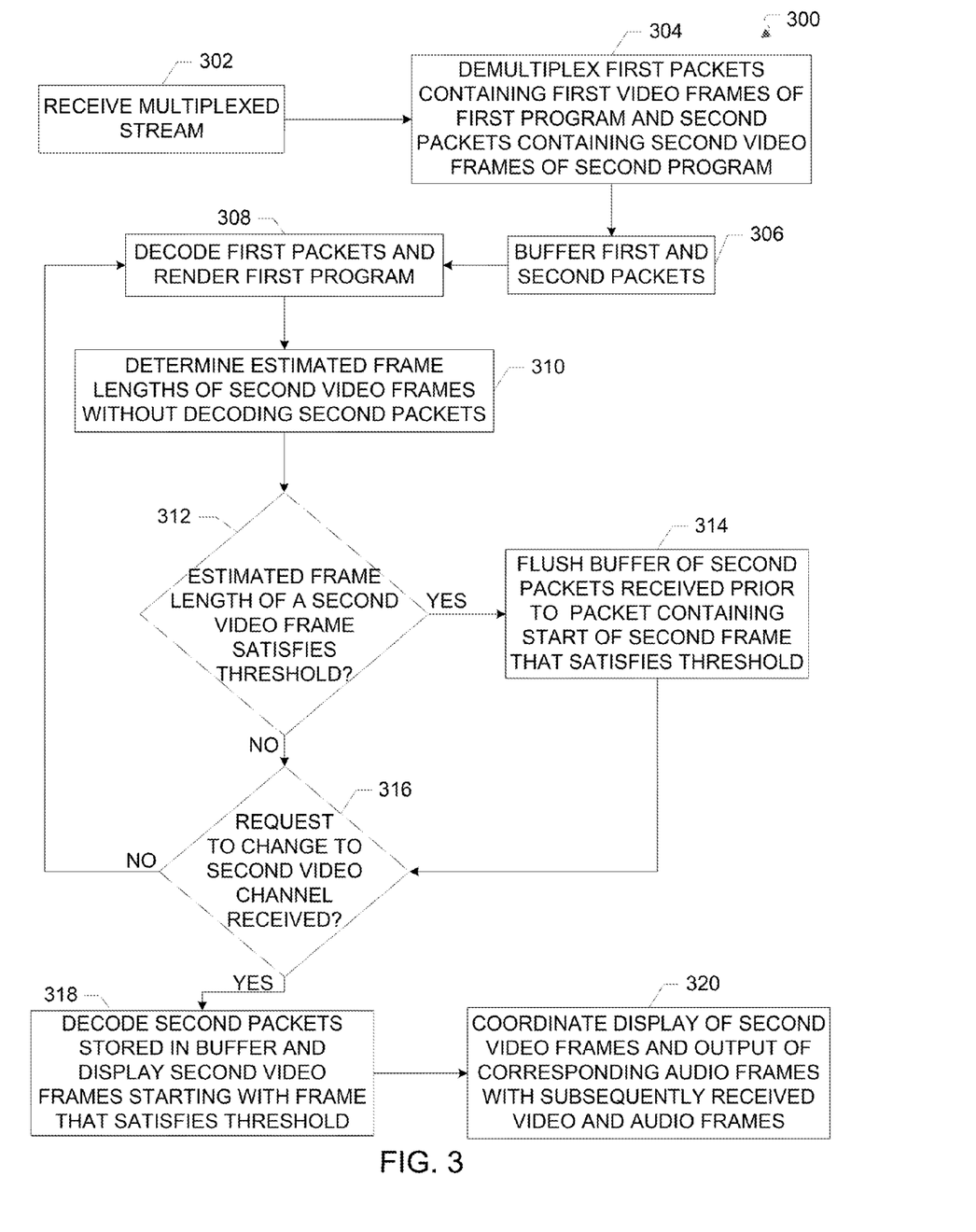
FIG. 3 illustrates a flow diagram of an example process of a video channel change system in accordance with one or more implementations.

FIG. 3 illustrates a flow diagram of an example process 300 of a video channel change system in accordance with one or more implementations. For explanatory purposes, the example process 300 is described herein with reference to the electronic device 120 of FIGS. 1 and 2; however, the example process 300 is not limited to the electronic device 120 of FIGS. 1 and 2, and the example process 300 may be performed by one or more other components of the electronic device 120. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed.

The electronic device 120 receives a multiplexed stream (302), such as from a CDN 110. The electronic device 120 demultiplexes, from the multiplexed stream, first transport stream packets that contain first video frames of a first program and second transport stream packets that contain second video frames of a second program (304). For example, the demultiplexer 230 of the electronic device 120 may demultiplex the first and second transport stream packets from the multiplexed stream. The electronic device 120 may store the first transport stream packets, or the PES data carried by the first transport stream packets, in the buffer 202C and may store the second transport stream packets in the buffer 202B (306).

The electronic device 120 may immediately start decoding the first transport stream packets, or the PES data carried therein, from the buffer 202C and displaying the first program, e.g. on the display 124 (308). For example, the decoder 214 of the electronic device 120 decodes the PES data and displays the first program on the display 124. The electronic device 120 determines the estimated frame lengths of the second video frames of the second program without decoding the second transport stream packets (310). For example, the primer 212B may access the header of each transport stream packet of the second video program, e.g. as the each transport stream packet is received and/or as each transport stream packet is stored in the buffer 202B, to determine whether the transport stream packet contains an indication that the transport stream packet includes the start of one of the second video frames, e.g. a PUSI that is set to one which indicates that the transport stream packet includes the start of a PES packet and consequently the start of a second video frame. The primer 212B may access the header of each transport stream packet without decoding the transport stream packet.

When the primer 212B identifies a transport stream packet of the second video program that includes a PUSI that is set to one, the primer 212B counts the number of transport stream packets that are received until the next transport stream packet of the second video program that includes a PUSI that is set to one is received. The primer 212B may determine the estimated frame length of a second video frame of the second program that is contained in the transport stream packets by multiplying the counted number of transport stream packets by the size of the payloads of the transport stream packets.

The electronic device 120, and/or the primer 212B, may determine whether the estimated frame length of the second video frame of the second program satisfies a threshold (312). In one or more implementations, the threshold may correspond to a frame length and the threshold may be satisfied if the estimated frame length of the second video frame is greater than the threshold. For example, since the frame length of a random access point, such as an I-frame, may be significantly larger than the frame length of other frame types, such as P-frames and B-frames, the electronic device 120 may set the threshold equal to one and half times the average frame length of a P-frame and/or B-frame. In one or more implementations, the electronic device 120 may be configured to include the average frame length of P-frames and/or B-frames, or the electronic device 120 may determine the average frame length of P-frames and/or B-frames based on the first video frames of the first program that are decoded by the decoder 214.

In one or more implementations, the electronic device 120 may determine the threshold for a video channel while video frames of a program of the video channel are being decoded and displayed by the decoder 214. For example, the electronic device 120 may monitor the average frame length of B-frames and/or P-frames, along with the average frame length of I-frames, as the video frames are being decoded by the decoder 214. The electronic device 120 may determine a threshold value such that the I-frames can be differentiated from the B-frames and the P-frames based on frame length. For example, the electronic device 120 may set the threshold to a value that is in the middle of the average length of the I-frames and the average length of the P-frames and/or B-frames. The electronic device 120 may then store the threshold in the memory 220 along with an association with the video channel and/or the video program. For example, the electronic device 120 may be able to determine an identifier of the video channel and/or video program from the overhead information items and/or from program guide information. Thus, when transport stream packets of a video program of a video channel are subsequently buffered in the buffer 202B, the primer 212B may determine an identifier of the video program and/or the video channel and may retrieve a threshold from the memory 220 that is associated with the video program and/or the video channel.

If the primer 212B determines that the estimated frame length of the second video frame satisfies the threshold (312), e.g. the second video frame is, or includes, a random access point, the primer 212B flushes the buffer 202B of any transport stream packets that were received prior to the transport stream packet that includes the start of the second video frame that satisfies the threshold (314). The electronic device 120 determines whether a request to change to a second video channel associated with the second program is received (316). For example, a user may transmit a request to change video channels to the electronic device 120, such as via a remote control.

If the electronic device 120 determines that a request to change to a second video channel that is associated with the second program has not been received (316), the electronic device 120 continues to decode and display the first program (308), e.g. via the decoder 214, and manage the buffer 202B that is buffering the transport stream packets of the second program (310)-(314), e.g. via the primer 212B. If the electronic device 120 determines that a request to change to the second video channel that is associated with the second program has been received (316), the decoder 214 of the electronic device 120 begins to decode and/or decrypt the transport stream packets that are stored in the buffer 202B, starting with the video frame that satisfied the threshold (312), and displays the second video program on the display 124 (318).

Since the decoder 214 will first need to decode and display the second video frames of the buffered transport stream packets for the second program, there may be a delay before the decoder 214 starts decoding and displaying the video frames of the live transport stream packets for the second program. Thus, the electronic device 120 coordinates the display of the buffered second video frames, and the output of the corresponding audio frames, with the subsequently received video frames and/or audio frames (320), e.g. the video and/or audio frames of the live stream. An example process for coordinating the display of the buffered video frames and/or the output of the buffered audio frames with the subsequently received video and/or audio frames is discussed further below with respect to FIG. 4.

Figure 4:
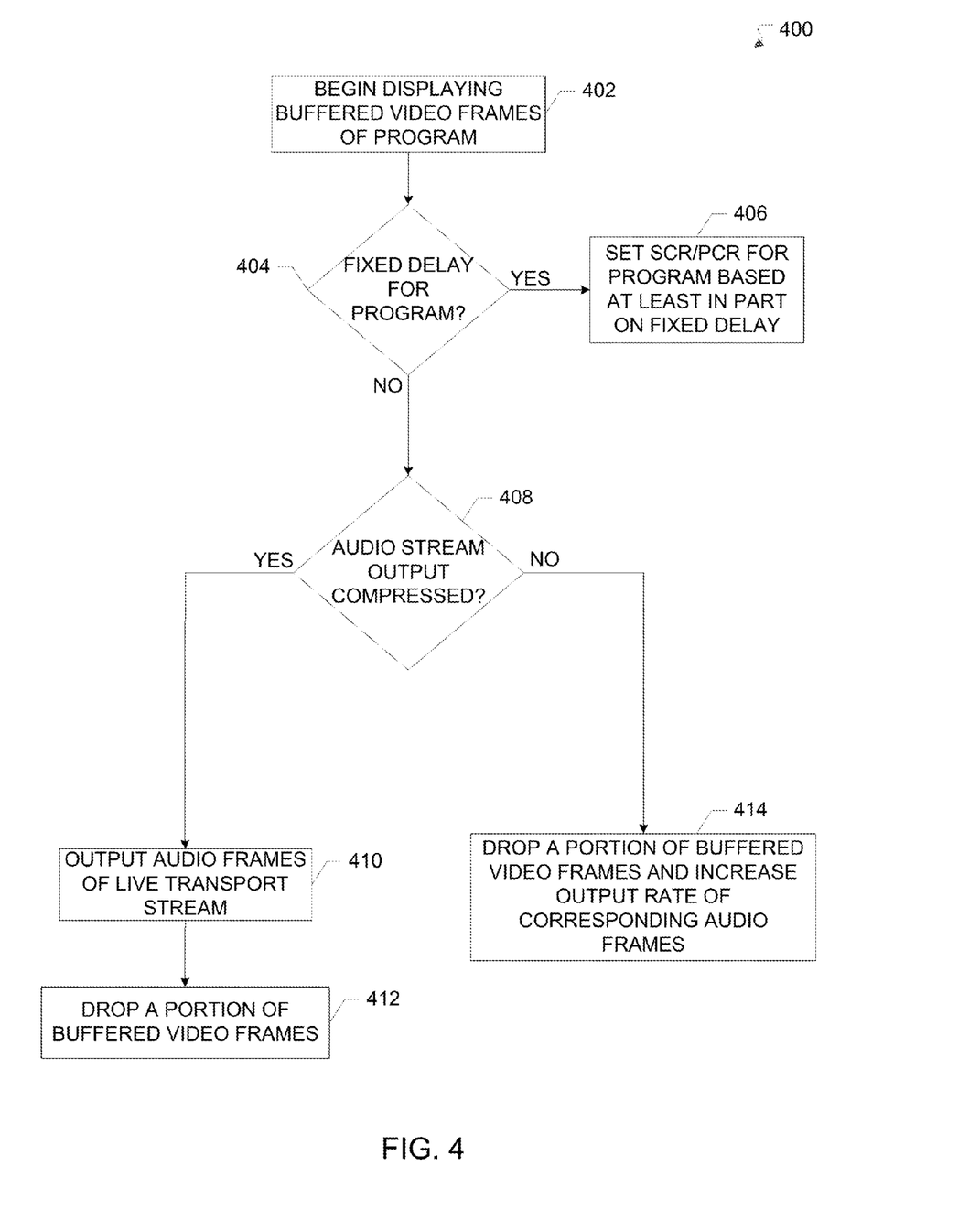
FIG. 4 illustrates a flow diagram of an example process of a video channel change system in accordance with one or more implementations.

FIG. 4 illustrates a flow diagram of an example process 400 of a video channel change system in accordance with one or more implementations. For explanatory purposes, the example process 400 is described herein with reference to the electronic device 120 of FIGS. 1 and 2; however, the example process 400 is not limited to the electronic device 120 of FIGS. 1 and 2, and the example process 400 may be performed by one or more other components of the electronic device 120. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

When a change from a first video channel to a second video channel occurs, the electronic device 120, e.g. via the decoder 214, retrieves the transport stream packets associated with the second video channel from one of the buffers 202A-B, such as the buffer 202B, and begins decoding and displaying the video frames for a program of the second video channel (402), while additional transport stream packets for the program are being received by the electronic device 120. The electronic device 120 determines whether the delay from the time that the additional transport stream packets are received until the video frames of the additional transport stream packets are displayed will be fixed for the duration of the program (404). For example, if the delay is below a threshold, such as less than one second, the electronic device 120 may determine that the delay will be fixed. In one or more implementations, the electronic device 120 may be configured to implement fixed delays for one or more video channels.

If the electronic device 120 determines that there will be a fixed delay for the program (404), the electronic device 120 moves to block 406. In block 406, the electronic device 120 overwrites the system clock reference (SCR) and/or the program clock reference (PCR) of the transport stream corresponding to the program. Since the presentation time stamps (PTS) of the transport stream are given in units relative to the PCR or the SCR, a fixed delay can be implemented by overwriting the PCR and/or the SCR of the transport stream. Alternatively, or in addition, an offset may be used that is always added to the PCR found in the transport stream. Thus, although the decoder 214 may decode the transport stream packets and display the video frames in accordance with the PTSs, the PTSs will reflect the fixed delay since they are given in units relative to the PCR or the SCR. In one or more implementations, the electronic device 120 may overwrite each PTS to affect the fixed delay.

If the electronic device 120 determines that there will not be a fixed delay for the program (404), the electronic device 120 determines whether the audio stream output for the program is compressed (408). In one or more implementations, the audio stream may be output in a compressed form or in an uncompressed form. If the electronic device 120 determines that the audio stream output is not compressed (408), the electronic device 120, e.g. via the decoder 214, drops a portion of the video frames being displayed from the buffered transport stream packets and increases the output rate, or the rendering rate, of the audio frames until the decoder 214 is able to decode the received transport stream packets in accordance with their associated PTSs (414), e.g. until the decoder 214 is able to catch up to the live transport stream. For example, the decoder 214 may drop intermittent video frames until the decoder 214 catches up to the live transport stream.

If the electronic device 120 determines that the audio stream output is compressed (408), the electronic device 120, e.g. via the decoder 214, drops the audio frames corresponding to the video frames of the buffered transport stream packets and outputs the audio frames that correspond to the additional transport stream packets, as the additional transport stream packets are received (410). The electronic device 120, e.g. via the decoder 214, also drops a portion of the video frames being displayed from the buffered transport stream packets until the decoder 214 catches up to the live transport stream (412). Thus, there the outputted audio frames and the displayed video frames may be out of sync until the decoder 214 catches up to the live transport stream.

Figure 5:
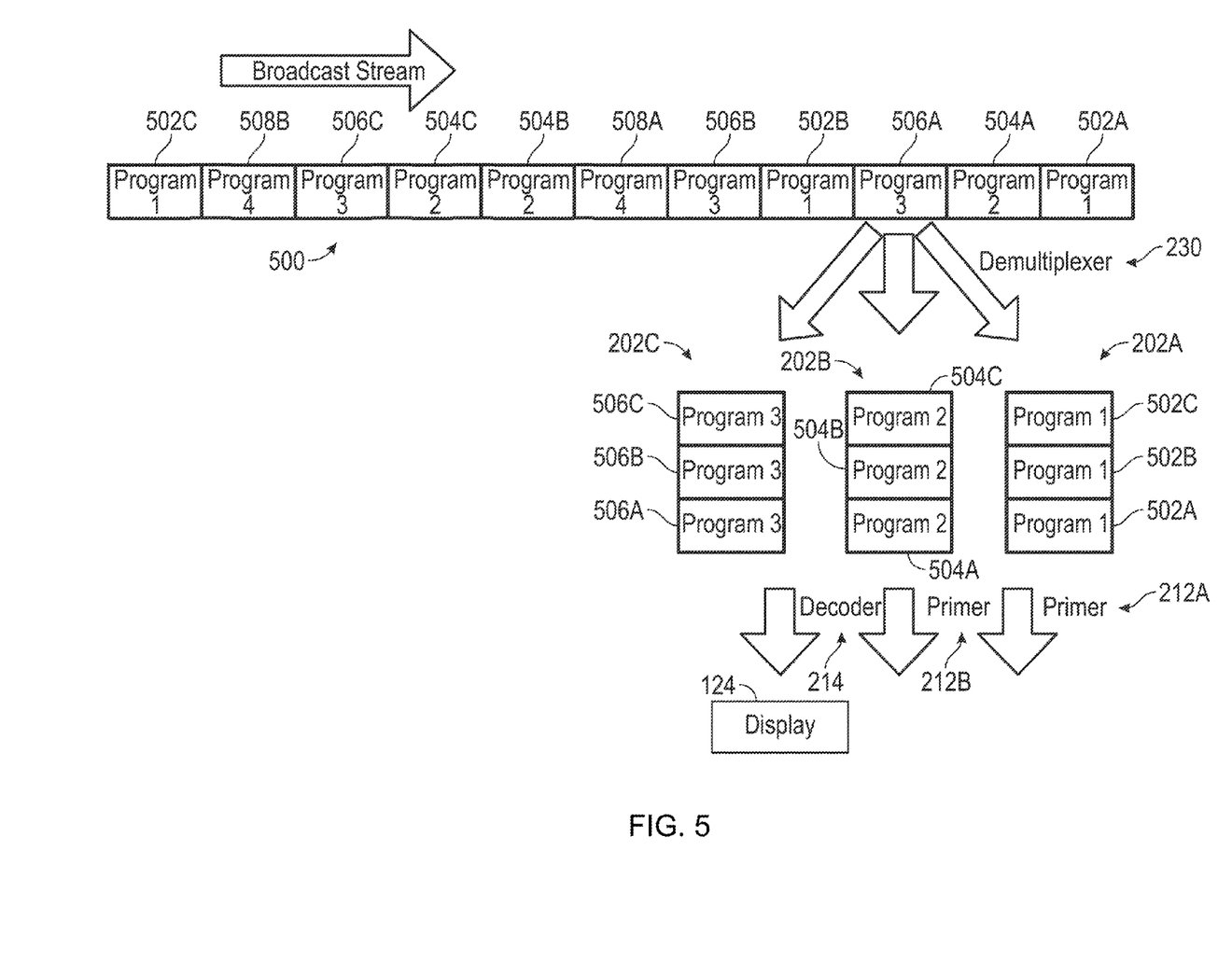
FIG. 5 illustrates an example multiplexed stream in a video channel change system in accordance with one or more implementations.

FIG. 5 illustrates an example multiplexed stream 500 in a video channel change system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example multiplexed stream 500 includes program 1 transport stream packets 502A-C, program 2 transport stream packets 504A-C, program 3 transport stream packets 506A-C, and program 4 transport stream packets 508A-B. In one or more implementations, program 1 may be an audio and/or video program on a first video channel, program 2 may be an audio and/or video program on a second video channel, program 3 may be an audio and/or video program on a third video channel, and program 4 may be an audio and/or video program on a fourth video channel.

In operation, the demultiplexer 230 of the electronic device 120 demultiplexes the program 1, 2, and 3 transport stream packets 502A-C, 504A-C, and 506A-C from the multiplexed stream 500. In one or more implementations, the program 4 transport stream packets 508A-C may be dropped. The electronic device 120 may buffer the program 1 transport stream packets 502A-C in the buffer 202A and the program 2 transport stream packets 504A-C in the buffer 202B. The electronic device 120 may retrieve the PES data from the program 3 transport stream packets 506A-C and may store the PES data in the buffer 202C, such as a compressed data buffer.

The decoder 214 retrieves the PES data for the program 3 from the buffer 202C, decodes the PES data, and displays program 3 on the display 124. While the decoder 214 is decoding and displaying the program 3 transport stream packets 506A-C, the primer 212A is managing the buffer 202A and the primer 212B is managing the buffer 202B, such that the buffers 202A-B each only include a single random access point, such as a single I-frame. For example, the primers 212A-B may implement one or more steps of the process discussed above with respect to FIG. 3 in order to manage the buffers 202A-B. Thus, if the electronic device 120 receives a request to change video channels to the video channel associated with program 2, the electronic device 120 can start decoding the program 2 transport stream packets 504A-C from the buffer 202B starting with the first program 2 transport stream packet 504A that is stored in the buffer 202B.

Figure 6:
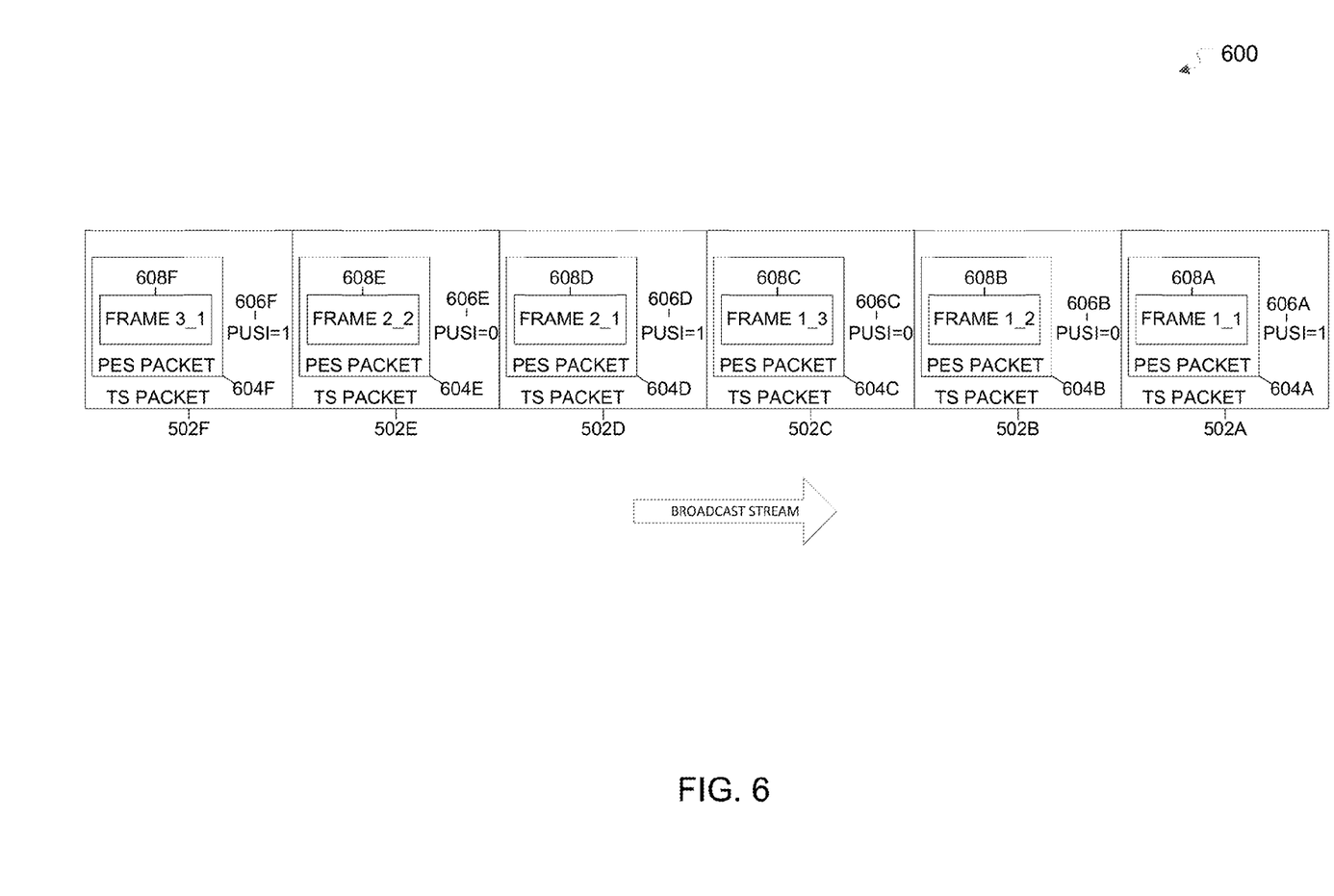
FIG. 6 illustrates an example transport stream in a video channel change system in accordance with one or more implementations.

FIG. 6 illustrates an example transport stream 600 in a video channel change system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The transport stream 600 includes the program 1 transport stream packets 502A-F. For example, the electronic device 120 may demultiplex, via the demultiplexer 230, the multiplexed stream 500 to retrieve the program 1 transport stream packets 502A-F. The program 1 transport stream packets 502A-F may each include a packetized elementary stream (PES) packet 604A-F, and an indicator 606A-F that indicates whether the PES packet 604A-F contains the start of a video frame. The PES packets 604A-F may each include a portion of a video frame 608A-F. In one or more implementations, a PES packet 604A may include a portion of two video frames, such as the end of a first video frame and the beginning of the next video frame. The indicators 606A-F may be PUSI bits and may indicate whether the portions of the video frames 608A-F included in the PES packets 60A-F include the start of a video frame. In one or more implementations, the indicators 606A-F may be stored in headers of the program 1 transport stream packets 502A-F.

Thus, in FIG. 6, the program 1 transport stream packets 502A, 502D, 502F include portions of video frames 608A, 608D, 608F, that contain the start of frames 1, 2, and 3, respectively. Therefore the indicators 606A, 606D, 606F are set to one to indicate that the portions of the video frames 608A, 608D, 608F contain the start of a video frame. However, the transport stream packets 502B, 502C, 502E include portions of video frames 608B, 608C, 608E that contain second portions of frames 1, 2, and 3, respectively. Thus, the indicators 606B, 606C, 606E are set to zero to indicate that the portions of the video frame 608B, 608C, 608E do not contain the start of a video frame.

Figure 7:
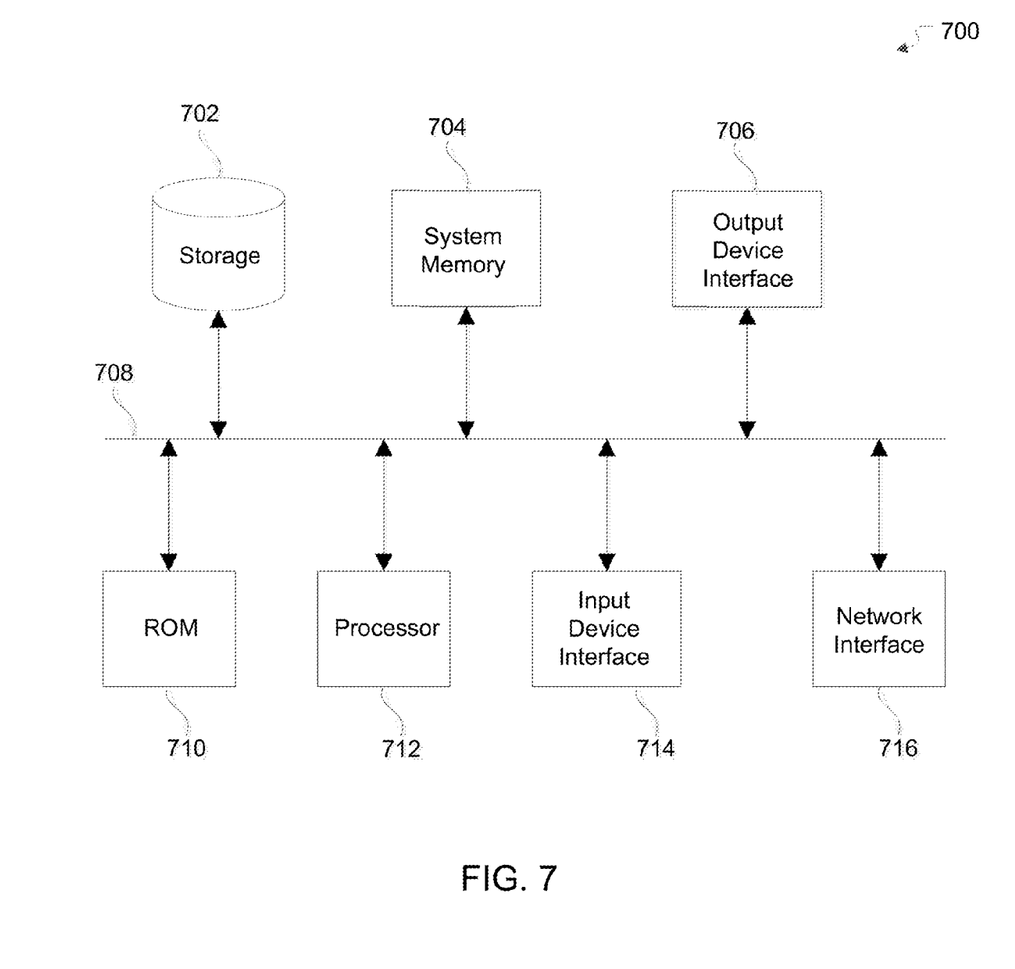
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, can be a desktop computer, a laptop computer, a tablet computer, a server, a switch, a router, a base station, a receiver, a phone, a personal digital assistant (PDA), or generally any electronic device that transmits signals over a network. The electronic system 700 can be, and/or can be a part of, the content server 112 and/or the electronic device 120. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, and a network interface 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to a network (not shown) through the network interface 716. In this manner, the electronic system 700 can be a part of a network of computers (such as a local area network ("LAN"), a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology. U.S. application Ser. No. 12/493,464, filed on Jun. 29, 2009 is hereby incorporated by reference in its entirety for all purposes.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    at least one processor circuit that is configured to:
        receive first packets that include first video frames and second packets that include second video frames;
        decode the first packets and displaying the first video frames while buffering, in a buffer, the second packets irrespective of whether the second packets include a random access point;
        determine that one of the second packets includes the random access point; and
        discard the second packets from the buffer that were received prior to the one of the second packets that includes the random access point and buffering, in the buffer, additional second packets received subsequent to the one of the second packets that includes the random access point.

2. The device of claim 1, wherein the first video frames are associated with a first video channel, the second video frames are associated with a second video channel, and the at least one processor circuit is further configured to:
    decode the second packets stored in the buffer and display the second video frames included therein, in response to a request to change from the first video channel to the second video channel.

3. The device of claim 2, wherein the at least one processor circuit is further configured to:
    output audio frames that correspond to the second video frames while displaying the second video frames.

4. A computer program product comprising instructions stored in a non-transitory tangible computer-readable storage medium, the instructions comprising:
    instructions to receive and decode a first plurality of packets comprising a first plurality of video frames and displaying the first plurality of video frames while receiving and buffering, in a buffer, a second plurality of packets comprising a second plurality of video frames irrespective of whether each of the second plurality of packets includes one of the second plurality of video frames that a random access point;
    instructions to determine a most recently received packet of the second plurality of packets that includes the of the second plurality of video frames that comprises the random access point;
    instructions to discard, from the buffer, any of the second plurality of packets that were received prior to the most recently received packet of the plurality of the second plurality of packets that includes the of the plurality of video frames that comprises the random access point; and
    instructions to decode the second plurality of packets from the buffer starting from the most recently received packet of the second plurality of packets that includes the one of the second plurality of video frames that comprises the random access point and to display the second plurality of video frames starting from the one of the second plurality of video frames that comprises the random access point, in response to a request therefor.

5. A method for performing video channel change, the method comprising:
    receiving a first plurality of packets multiplexed with a second plurality of packets, wherein the first plurality of packets comprise a first plurality of video frames of a first program and the second plurality of packets comprise a second plurality of video frames of a second program;
    demultiplexing the first plurality of packets from the second plurality of packets;
    decoding the first plurality of packets and displaying, on a display, the first plurality of video frames of the first program while buffering, in a buffer, the second plurality of packets irrespective of whether each of the second plurality of packets includes one of the second plurality of video frames that a random access point;
    determining a most recently received packet of the second plurality of packets that includes the one of the second plurality of video frames that comprises the random access point;
    buffering, in the buffer, additional packets of the second plurality of packets received subsequent to the one of the second plurality of packets that includes the one of the second plurality of video frames that comprises the random access point; and
    decoding the second plurality of packets stored in the buffer and displaying, on the display, the second plurality of video frames of the second program starting from the one of the second plurality of video frames that comprises the random access point, in response to a request to change from the first program to the second program.

6. The device of claim 2, wherein the first video frames correspond to a first program, the second video frames correspond to a second program, and the at least one processor circuit is further configured to:
    receive a digital bitstream comprising multiplexed programs including the first program and the second program.

7. The device of claim 6, wherein the at least one processor circuit is further configured to:
    demultiplex the multiplexed programs to obtain the first packets that include the first video frames that correspond to the first program and the second packets that include the second video frames that correspond to the second program.

8. The device of claim 6, wherein the at least one processor circuit is further configured to:
perform program specific (PSI) acquisition from the digital bitstream;
process entitlement control messages (ECMs) in the digital bitstream; and
decode the first packets based at least in part on the PSI or ECMs.

9. The device of claim 8, wherein the at least one processor circuit is further configured to:
decode the second packets based at least in part on the PSI or ECMs used to decode the first packets.

10. The device of claim 8, wherein the at least one processor circuit is further configured to:
decode the second packets without re-performing the PSI acquisition and without re-processing the ECMs.

11. The device of claim 1, wherein the at least one processor circuit is further configured to:
determine that the one of the second packets includes the random access point based at least in part on analyzing two of the second packets.

12. The computer program product of claim 4, wherein the instructions further comprise:
instructions to output audio frames that correspond to the second plurality of video frames while displaying the second plurality of video frames.

13. The computer program product of claim 4, wherein the first plurality of video frames correspond to a first program, the second plurality of video frames correspond to a second program, and the instructions further comprise:
instructions to receive a digital bitstream comprising multiplexed programs including the first program and the second program.

14. The computer program product of claim 13, wherein the instructions further comprise:
instructions to demultiplex the multiplexed programs to obtain the first plurality of packets that comprise the first video frames that correspond to the first program and the second plurality of packets that comprise the second video frames that correspond to the second program.

15. The computer program product of claim 14, wherein the instructions further comprise:
instructions to perform program specific (PSI) acquisition from the digital bitstream;
instructions to process entitlement control messages (ECMs) in the digital bitstream; and
instructions to decode the first plurality of packets based at least in part on the PSI or ECMs.

16. The computer program product of claim 15, wherein the instructions further comprise:
instructions to decode the second plurality of packets based at least in part on the PSI or ECMs used to decode the first plurality of packets.

17. The computer program product of claim 16, wherein the instructions further comprise:
instructions to decode the second plurality of packets without re-performing the PSI acquisition and without re-processing the ECMs.

18. The computer program product of claim 13, wherein the request comprises a request to change from the first program to the second program and the buffer comprises a compressed data buffer.

19. The method of claim 5, further comprising:
discarding, from the buffer, any of the second plurality of packets that were received prior to the most recently received packet of the second plurality of packets that includes one of the second plurality of video frames that comprises the random access point.

20. The method of claim 5, wherein the first plurality of packets multiplexed with the second plurality of packets comprises a digital bitstream, and the method further comprises:
performing program specific (PSI) acquisition from the digital bitstream;
processing entitlement control messages (ECMs) in the digital bitstream;
decoding the first plurality of packets based at least in part on the PSI or ECMs; and
decoding the second plurality of packets based at least in part on the PSI or ECMs used to decode the first plurality of packets.

* * * * *

UNITED STATES PATENT AND TRADEMARK OFFICE
CERTIFICATE OF CORRECTION

PATENT NO. : 9,749,678 B2  
APPLICATION NO. : 14/624544  
DATED : August 29, 2017  
INVENTOR(S) : Marcus Christopher Kellerman et al.

Page 1 of 1

It is certified that error appears in the above-identified patent and that said Letters Patent is hereby corrected as shown below:

In the Claims

Column 18, Claim 4, Line 4, "includes the of" should be --includes the one of--.

Signed and Sealed this  
First Day of October, 2019

Andrei Iancu  
*Director of the United States Patent and Trademark Office*